Sept. 13, 1955 E. C. BEST 2,717,827
VAPORIZED FUEL INJECTION CARBURETOR
Filed Jan. 15, 1953
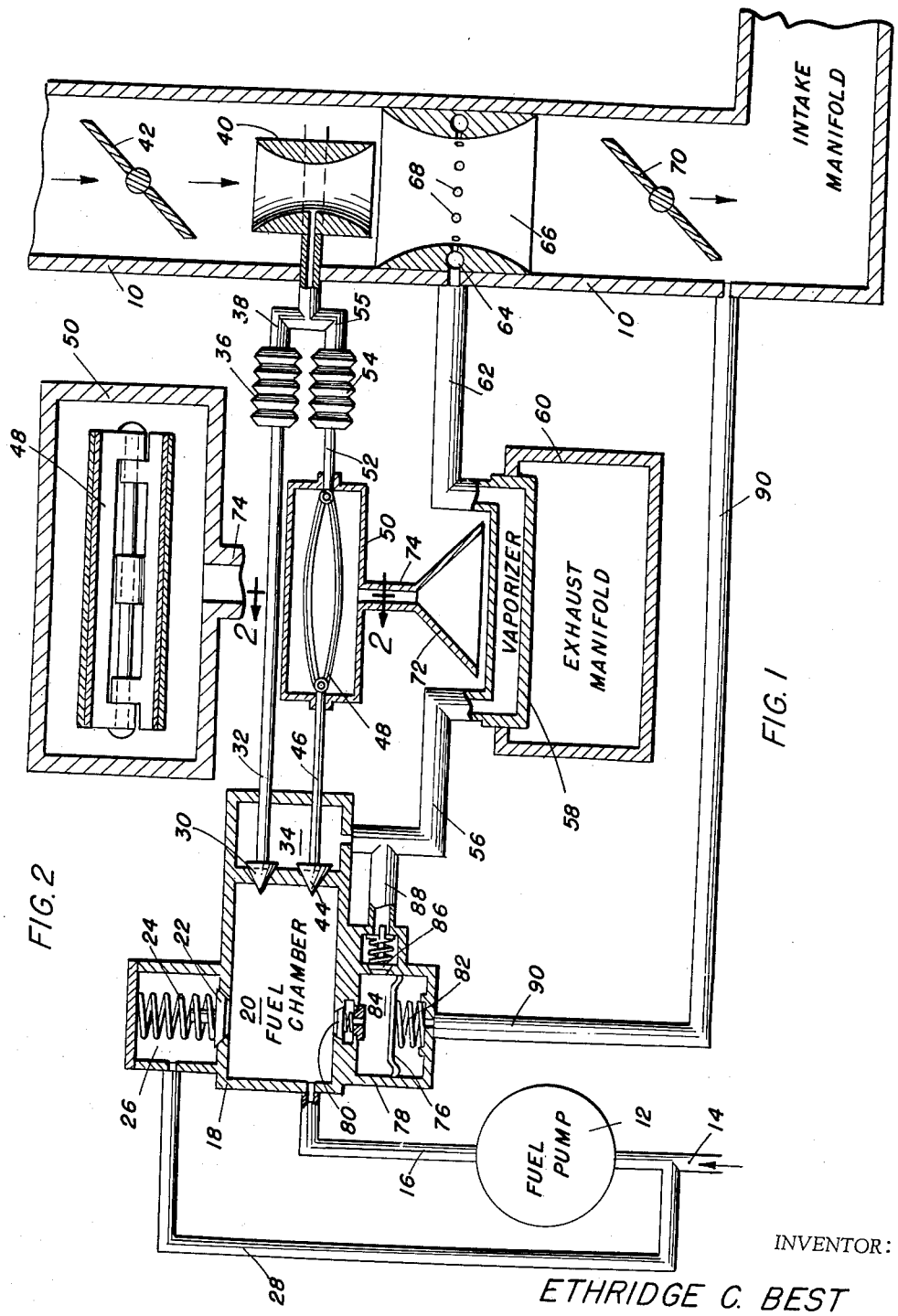
INVENTOR:
ETHRIDGE C. BEST
BY
ATTORNEYS

United States Patent Office 2,717,827
Patented Sept. 13, 1955

2,717,827

VAPORIZED FUEL INJECTION CARBURETOR

Ethridge C. Best, Washington, D. C.

Application January 15, 1953, Serial No. 331,520

6 Claims. (Cl. 48—144)

(Granted under Title 35, U. S. Code (1952), sec. 266)

This invention relates in general to a carburetor of the vaporized fuel-injection type and is more particularly described as a carburetor system in which fuel is introduced into the air supply as a gaseous vapor after being metered as a liquid using heat from the exhaust gases to convert the liquid fuel to a gaseous vapor.

The present methods of carburetion comprise the injection of fuel into an intake manifold by atomizing or spraying it into the air stream thereby resulting in a combustible mixture which is not a true gaseous or dry mixture of gasoline and air but is composed of minute droplets suspended in the air. While this system may be efficient for aircraft engines, it is not feasible for low-powered engines, such as the automotive type.

A second method is the venturi carburetion through metered jets as used by most automotive engines which is the simplest and cheap in construction but probably the least efficient of all types since this carburetor atomizes the fuel into droplets which fail to form a homogeneous gaseous mixture of fuel and air.

A third type is the surface or vapor carburetion by the saturation of air with gasoline through intimate contact, such as by passing the intake air through a surface or several surfaces or layers of fuel.

These systems are both bulky and tend to create a fire and explosion hazard in addition to which the heated-air method lowers the volumetric efficiencies of the engine.

The present invention is for a new method of carburetion of fuel for internal combustion engine with the purpose of effecting greater economy of fuel with increased power and efficiency. The commonest forms of carburetion, such as the injection and venturi types of which this system is an improvement, have the main disadvantage of atomizing or spraying the fuel into the intake air resulting in minute droplets of fuel suspended in air for the mixture. When ignited, only partial combustion results with the outer molecules being completely burned and the inner molecules being only partially burned for lack of oxygen in close contact.

The mechanics of this process is that upon ignition the outer molecules which are in intimate contact with the air will burn completely forming a wall of $CO_2$ through which insufficient air passes to support complete combustion of the inner molecules. This wall or surrounding layer tends also to snuff out the burning of inner molecules. In the present invention, various structural means may be used to accomplish the desired result but the main principle employed is to introduce fuel in the form of gaseous vapor into the air supply after first being metered as a liquid and then using the heat of combustion or other heat to change the liquid fuel into a gaseous vapor which is introduced into the incoming air.

An important object of the invention is to provide a fuel-injection carburetor in which fuels of low volatility may be used due to the vaporizing feature.

A further object of the invention is to provide a carburetor of the vaporized fuel-injection type in which greater economy of fuel is attained over jet or injection carburetion.

A still further object of the invention is to provide a carburetor of this type in which the economy effected is due to the introduction of the fuel into the air in the form of a true gas or vapor which has a high molecular activity and separation.

Still a further object of the invention is to provide a vaporized fuel-injection carburetor in which complete combustion results with low carbon residue and negligible CO content in the exhaust gases.

Other objects of the invention will appear in the specification and will be apparent from the accompanying drawings, in which, Fig. 1 is a somewhat diagrammatic view, partially in section, of a vaporized fuel-injection carburetor in accordance with this invention; and Fig. 2 is an enlarged sectional view taken in the line 2—2 of Fig. 1 showing a thermostatic linkage element.

The present invention is described as applied to a common type of internal combustion engine as used for automobiles and the like having an intake manifold 10 for receiving the carbureted mixture and a fuel pump 12 usually operated by the engine for supplying fuel from a suitable source of supply to be metered and vaporized before supplied to the intake manifold.

Referring now more particularly to the drawings, a fuel intake pipe 14 is connected to the pump 12 and from the pump a discharge pipe 16 leads to a closed casing 18 in which there is a fuel chamber 20. Fuel supplied to this chamber is maintained at a constant pressure by a relief valve 22 at the top of the casing having a valve spring 24 located in a closed valve chamber 26 and tending to keep the valve closed against the pressure in the fuel chamber. Extending from the valve chamber 26 to the intake side of the fuel pump is an overflow or a return bypass pipe 28 which returns any surplus fuel from fuel chamber 20.

Fuel is metered by a metering valve 30 at one side of the fuel chamber having a stem 32 which extends through fuel metering chamber 34 at one side of the fuel chamber and outwardly therefrom to a Sylphon bellows or bellows 36. The other end of the Sylphon is connected by a pipe 38 to a venturi 40 supported centrally in the intake manifold and preferably adjacent a choke or priming valve 42 located in advance thereof in the path of air in the manifold. Extending parallel with the metering valve 30 is another metering valve 44 which also communicates with the fuel chamber 20 and has a stem 46 extending through the metering chamber 34 and outwardly therefrom to a thermostatic element 48 located in a chamber 50, and outwardly at the opposite end therefrom where it is connected by a stem 52 with one end of a Sylphon bellows 54, parallel with the bellows 36 and connected to the pipe 38 by an extension 55, so that the two bellows 36 and 54 and the two metering valves 30 and 44 receive pressure and may be operated in parallel from the venturi 40.

The displacement of the metering valve 30 is proportional to the mass of air entering the carburetor as the bellows 36 is actuated by suction or pressure differential from the venturi 40. The other metering valve 44 is likewise displaced and acted upon by the bellows 54 but is also subject to another movement of the thermostatic device 48.

Fuel from the metering chamber 34 is conducted through a pipe 56 to a flash vaporizer 58 which extends into and is heated by hot gases in an exhaust manifold 60. The other side of the vaporizer is connected by a pipe 62 with an annular passage 64 in a throat venturi 66 which has a number of inlet openings 68 communicating with the passage 64, so that the fuel after it passes through the vaporizer is discharged in a gaseous form through the openings 68 where it is mixed with the intake air as a pure gas. In the intake manifold following the throat venturi is a throttle valve 70 which is operated in any well-known manner for controlling the speed of the engine.

To provide for operation prior to the heating of the flash vaporizer 58, a richer mixture must be provided which is accomplished by the warm-up metering valve 44 connected to the bellows 54 through a thermoplastic element 48 which is heated in the chamber 50 by a flaring hood 72 overlying the vaporizer 58 and connected to the casing by a pipe 74. It is also necessary to provide additional fuel for a sudden acceleration which may be accomplished by an accelerating pump 76 in the form of a diaphragm located in a pump casing 78 communicating with the bottom of a fuel chamber 20 through a valve 80. One side of the diaphragm is engaged by a spring 82 and at the other side of the diaphragm is a pump casing 84 connected through a check valve 86 with which pipe 88 is connected to the pipe 56 leading to the vaporizer 58. The diaphragm 76 is operated against spring 82 by a suction pipe 90 leading from the spring side of the casing 78 and connected to the intake manifold just beyond the throat venturi 66.

In operation, cranking of the engine builds up a pressure in the fuel chamber 20 by the operation of the fuel pump 12. If the pressure is too great, the excess is discharged through check valve 22 and the bypass pipe 28 to the intake side of the fuel pump. A drop in pressure occurs in the intake manifold which acts through the venturi 40 to cause a reduction. Liquid fuel then flows from the fuel chamber 20 into the metering chamber 34 through the flash vaporizer 58 and thence to the throat discharge venturi 66 where it is mixed with air to form a combustible mixture.

After starting, the engine warms up heating the exhaust manifold 60 and raising the temperature in the flash vaporizer 58 to the vaporizing temperature of gasoline. Heat is also conducted from the vaporizer through the pipe 74 to the thermostatic device 48 which preferably comprises a pair of curved bimetallic elements which act to progressively close the metering valve 44 as the vaporizer 58 rises to the proper operating temperature. When the vaporizer reaches and maintains a temperature in excess of 70° C., all fuel will be completely vaporized as it passes through the pipes 56 and 62 prior to its discharge through the jet opening 68 of the throat venturi, and the warmup metering valve 44 will be closed by the operation of the bimetallic thermostat 48. From this point, the fuel will be supplied through the vaporizer as a true gas and in amounts proportional to the air passing through the venturi 40.

Since the ratio of fuel to air by weight is approximately 1 to 13 and the vaporizing temperature of gasoline is 70° C., the heat of the vaporized fuel will only increase the temperature of the mixture by about 10° C. when the outside air is 20° C. This rise is not enough to introduce detonation problems. Also, since pure fuel is vaporized within a small chamber, there is no danger of fire or explosion. Upon discharge from the venturi 66, the vapor is cooled far below the flash point.

Speed or power of the engine is usually controlled by a butterfly throttle valve 70 which regulates the amount of air entering the system.

With this construction, the introduction of fuel as a true gas or vapor into the air results in a homogeneous fuel air mixture with air surrounding each individual molecule which insures complete combustion so that fuels of low volatility may be used and there is a great economy in the use of the fuel which results in a low carbon residue and a negligible content of CO in the exhaust gases.

While a vaporizing carburetor of particular construction has been described in some detail, it should be regarded as an illustration or example rather than a restriction or limitation of the invention, as many details in the construction, combination, and arrangement of the parts may be made without departing from the spirit and scope of the invention.

The invention described herein may be manufactured and used by or for the Government of the United States of America for Governmental purposes without payment of any royalties thereon or therefor.

I claim:

1. A vaporizing carburetor comprising a casing with a fuel pressure chamber, means for pumping fuel to the chamber, means for maintaining constant pressure in the chamber, a metering chamber adjacent the pressure chamber and a valve for admitting fuel from the pressure to the metering chamber, a bellows connected at one end to the valve, a venturi in an air stream for the carburetor, tubular connecting means from the venturi to the interior of the bellows to control the movement of the valve by suction pressure differential from the venturi, and means for delivering fuel from the metering chamber to the air stream for the carburetor including a second valve for admitting fuel from the pressure chamber to the metering chamber, a second bellows connected at one end to the said second valve and having a tubular connecting means at its other end to the same venturi as the first bellows, and thermostatic means between the second metering valve and its bellows for additionally controlling the delivery of fuel from the metering chamber to the air stream.

2. A carburetor in accordance with claim 1 having a diaphragm pump in a chamber with a check valve connection with the fuel chamber and a connection for delivering additional fuel from the diaphragm pump chamber to the said fuel delivering means from the metering chamber to the air stream.

3. A vaporizing carburetor comprising a casing with a fuel pressure chamber, means for pumping fuel into the chamber, means for maintaining constant pressure in the chamber, a pair of fuel metering valves each having a separate bellows connected at one end and the other ends of the two bellows having tubular extensions connected together, a venturi in the air stream for the carburetor to which the extensions of the two bellows are connected, thermostatic means in the connection of one of the valves to its bellows, a metering chamber to which fuel from the fuel pressure chamber is delivered through the said valves, tubular means for delivering fuel from the metering chamber to the air stream for the carburetor, a vaporizer in the fuel delivery means, and a heat-conveying connection from the vaporizer to the said thermostatic device.

4. In a vaporizing carburetor a fuel pressure chamber, means for maintaining fuel under pressure in the chamber, a metering chamber adjacent to the fuel pressure chamber, a metering valve for controlling the flow of fuel from the pressure chamber to the metering chamber, a venturi in the air stream for the carburetor, a bellows connected at one end to the venturi, means for forming a mechanical connection from the other end of the bellows to the valve, a thermostatic linkage in the connection from the bellows to the valve, a tubular pipe connecting the metering chamber to the air stream for the carburetor, a vaporizer in the tubular connections means for directing heat to the thermostatic linkage, a second metering valve between the pressure and metering chambers, a second bellows connected in parallel with the first bellows to receive pressure from the venturi and a connection between the second bellows and the second metering valve for controlling the valve.

5. A vaporizing carburetor in accordance with claim 4 having a diaphragm pump with a chamber on one side connected to the fuel pressure chamber and a chamber at the other side of the diaphragm connected to an intake manifold to the carburetor beyond the venturi and a discharge connection from the fluid pressure side of the pump into the tubular connection leading to the vaporizer to deliver an additional amount of fuel to the air stream for the carburetor for sudden acceleration of the fuel.

6. In a vaporizing carburetor a casing having a fuel pressure chamber and a metering chamber connected therewith, means for maintaining pressure in the pressure chamber, a pair of metering valves for controlling the passage of fuel from the fuel chamber to the metering chamber, a venturi in the air stream for the carburetor, a pair of bellows connected to receive differential pressure from the venturi, a connection from the other end of each bellows to one of the valves, one of said connections including a thermostatic linkage, tubular supply means from the metering chamber to the air stream for the carburetor, a throat venturi connected to the tubular means in the air stream after the first venturi and having a plurality of internal jets supplied from a common annular passage to which the tubular connection is joined, an exhaust manifold vaporizer disposed in the tubular connection from the metering chamber to the air stream, means for directing heat from the vaporizer to the thermostatic linkage and an accelerating pump connected to the fuel pressure chamber and having a tubular operating connection from the pump to an intake manifold for the carburetor within the throat venturi and a discharge from the pump into said tubular means extending from the metering chamber to the vaporizer for providing additional fuel to the throat venturi for a sudden acceleration of the carburetor.

References Cited in the file of this patent

UNITED STATES PATENTS

| Number | Name | Date |
|---|---|---|
| 1,973,162 | Briggs | Sept. 11, 1934 |
| 2,261,446 | Ormsby | Nov. 4, 1941 |
| 2,420,079 | Holley | May 6, 1947 |
| 2,440,241 | Armstrong | Apr. 27, 1948 |
| 2,551,719 | Ball | May 8, 1951 |
| 2,585,171 | Pyle | Feb. 12, 1952 |
| 2,668,697 | Sager | Feb. 9, 1954 |